Nov. 30, 1965  K. B. CLARK  3,220,106
FORMING AND SOLID-PHASE BONDING
Filed Oct. 19, 1960  2 Sheets-Sheet 1

Kenneth B. Clark,
Inventor.
Koenig and Pope,
Attorneys.

Nov. 30, 1965  K. B. CLARK  3,220,106

FORMING AND SOLID-PHASE BONDING

Filed Oct. 19, 1960  2 Sheets-Sheet 2

Kenneth B. Clark,
Inventor.
Koenig and Pope,
Attorneys.

United States Patent Office 3,220,106
Patented Nov. 30, 1965

---

3,220,106
FORMING AND SOLID-PHASE BONDING
Kenneth B. Clark, Spragueville, R.I., assignor to Texas Instruments Incorporated, Dallas, Tex., a corporation of Delaware
Filed Oct. 19, 1960, Ser. No. 63,678
2 Claims. (Cl. 29—473.9)

This invention relates to forming and solid-phase bonding and with regard to certain more specific features, to the production of clad wire, hollow tubing, tube-in-sheet, rod-in-sheet and similar products.

Among the several objects of the invention may be noted the provision of a process of manufacturing products of the class above described by means of a simple, economical and high-speed roll-forming and bonding operation, said products in a wide variety of shapes, sizes and lengths having superior accuracy, finishes and bond strengths; and the provision of a process of the class described which requires no pneumatic or hydraulic expanding step such as practiced heretofore. Other objects and features will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of which will be indicated in the following claims.

In the accompanying drawings, in which several of various embodiments are illustrated, FIG. 1 is a diagrammatic side elevation (partly in section) illustrating the apparatus and process adapted to form clad wire, being viewed on line 1—1 of FIG. 2;

Corresponding reference characters indicate corresponding parts throughout the several views of the drawings.

Figure 1:
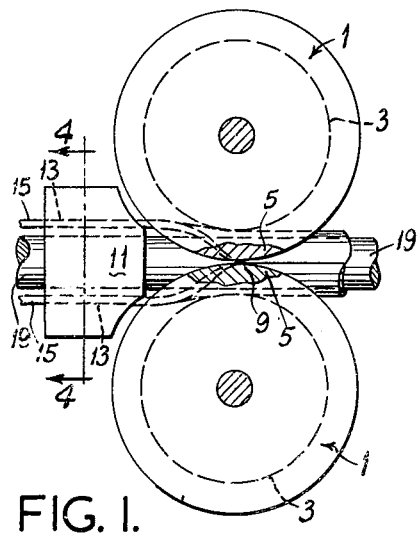
Figure 2:
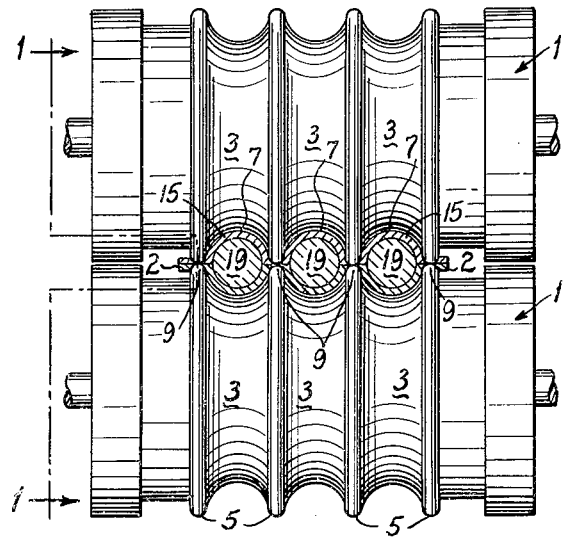
FIG. 2 is a right-side view of FIG. 1.

The term metal as used herein means any malleable or deformable metal, including alloys. The term solid-phase bonding as used herein means bonding under conditions of cleanliness, pressure and deformation without the production of liquid phase material or brittle intermetallic compounds in any appreciable amount, as set forth, for example, in U.S. Patent 2,691,815. The terms wire and rod are taken to be synonymous. The term cladding material comprehends metal and glass, ceramics, carbon, cermets and the like. Thus cladding may be effected by electrically conductive or insulating materials.

Referring now more particularly to FIGS. 1–5, there are shown at numerals 1 a pair of pressure rolls provided with approximately semicircular grooves 3 separated by lands 5, juxtaposed pairs of which are coplanar, as illustrated. Together, each pair of grooves 3 forms an approximate circle 7, each circle being spaced from the other by the width of a land 5. The tangentially disposed lands are preferably rounded, as shown, and are adapted by proper adjustment of the distance between roll centers to operate with little operating clearance between them, so as to form metal-squeezing pinch regions 9. The cross-sectional shapes of the grooves, while being shown as semicircular, may be of other forms, such as half ellipses or other useful shapes.

At 11 is shown an inlet guide block (FIGS. 1 and 4) in which are flat guide passages 13 for the sliding reception of sheet strips 15 composed of any desired malleable metal for cladding, as for example, aluminum, tin, nickel, copper, tantalum, gold-palladium alloy, et cetera.

The block also includes the circular guide holes 17 for the sliding reception of core-forming wires or rods 19 which also may be any malleable metal or alloy such as, for example, iron, copper, molybdenum, et cetera. The block 11 is made such that the outlets of passages 13 and 17 therein are fairly close to the pinch regions 9. Before the strips 15 and wires 19 are fed into the block 11, they are prepared by surface cleaning according to the solid-phase bonding process set forth in said patent. Strips 15 and wires 19 are then fed through the block openings 13 and 17 and into the rolls as they are rotated. At this stage the strip and wire materials are in the completely solid state, no heating for softening having been employed. Any heating that might be employed for cleaning purposes is not such as to change this state at the time the materials enter between the rolls. As a result, the strips 15 are deformed around the wires 19 by the grooves 3. They are also intermediately squeezed and reduced in thickness at 9 sufficiently to obtain a partial solid-phase bond under conditions of metal flow, according to the principles set forth in said patent.

If desired, the circles 7 formed by the conjugate grooves 3 between the rolls may be made somewhat smaller in diameter than the sum of the diameter of a wire 19 and twice the thickness of a strip 15. A squeezing and reduction action may thus also be obtained on the metals composing the sheets and wires so that they also become connected by a partial bond. This is a very desirable condition, although dispensable in some cases. In any event, reduction in the metal between the lands 5 brings about indispensable partial bonding in stripes or narrow web portions adjacent the cores 19, with the result that the wires 19 come from the rolls 1 clad with the material of strips 15 and held together by very thin stripes or webs between them. These stripes are in a state to be easily broken by bending for separation of the clad wires or rods and removal of scrap 2. Before separation, sintering at a temperature above the recrystallization temperature of the cladding is beneficial, as it lowers the strength of the greatly cold-worked webs, in addition to improving the bonds between them. This heating step also improves any partial bond between the wires 19 and their surrounding shells of strip material. It is, however, possible in many cases to separate the material in the partially bonded state without sintering, and to sinter thereafter to improve the bonds. In any event, the gang operation whereby a number of wires or rods and sheets of substantial widths are rolled together in the manner stated is conducive to high production rates.

Figure 5:
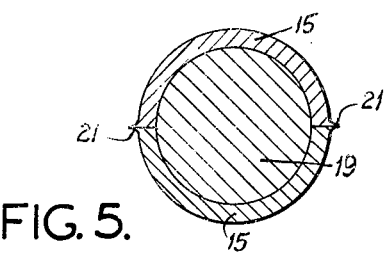
FIG. 5 is an enlarged cross section of the product formed by the process illustrated in FIGS. 1–4.

In FIG. 5 is shown a cross section of an example of the finished material which may consist of a core 19 of molybdenum with, for example, a cladding 15 of a gold-rich alloy. By "gold rich" is meant a gold alloy in which the gold constituent consists of at least 75% by weight of the alloy. Examples of such gold-rich alloys are gold-palladium, gold-silver and gold-platinum. Cladding 15 may also consist of substantially pure silver, platinum or palladium. These particular metals are here mentioned since such a combination of metals in clad wire form is particularly useful for grid wires in electronic tubes. The small fins indicated at 21 may be removed or removed in part on each side of the clad wire after separation of the strands. The part remining will generally blend into circular form if subsequent wire-drawing operations are performed on the clad product to reduce its diameter.

By a proper selection of core, sheet and groove sizes, almost any cladding to core ratio can be achieved and the product used for some applications, as clad, from the rolls 1. On the other hand, it may be drawn down to any size desired. As above inferred, the cladding 15 can be formed around the core 19 with the circles 7 dimensioned to give no reduction on either the cladding or the core; or substantial reduction can be given to both the cladding and the core in the cladding step by making these circles smaller or by increasing the cross-sectional dimensions of the materials. In either case, sufficient reduction is effected by the lands 5 to bond at the fins 21. The following examples are given for operations according to the method above described, assuming that the diameter of each pair of conjugate grooves 3 is .060 inch:

TABLE I

*Cladding wire using sheet stock*

| | Sheet and Core Material | Material and Starting Sizes | | As Clad Sizes | | Finished Diam. (inches) |
|---|---|---|---|---|---|---|
| | | Sheet Thickness (inches) | Wire Diam. (inches) | Cladding Thickness (inches) | Core Diam. (inches) | |
| 1 | Al clad Fe | .016 Al | .060 Fe | .008 Al | .044 Fe | .040 Drawn. |
| 2 | Al clad Cu | .016 Al | .054 Cu | .008 Al | .044 Cu | .040 Drawn. |
| 3 | Sn clad Cu | .030 Sn | .054 Cu | .014 Sn | .032 Cu | As clad. |
| 4 | Ni clad Cu | .002 Ni | .052 Cu | .002 Ni | .052 Cu | As clad. |
| 5 | Cu clad 52 Alloy. | .008 Cu | .054 52 Alloy. | .006 Cu | .048 52 Alloy. | |
| 6 | Cu clad Fe | .004 Cu | .052 Fe | .004 Cu | .052 Fe | As clad. |

In Table I the term "52 Alloy" is a trade designation for an alloy consisting essentially of approximately 51% nickel and the balance iron.

In the above Examples 1 and 2, some reduction as regards diameter occurred in the rolls and final finishing was obtained by subsequent drawing operations. In Examples 3 and 5, all the reduction as regards diameter occurred in passing through the rolls. Fins such as 21 remained. In Examples 4 and 6, no reduction as regards diameter occurred in the rolls, the only reduction therein having occurred at the pinches 9 to form fins such as 21.

Figure 6:
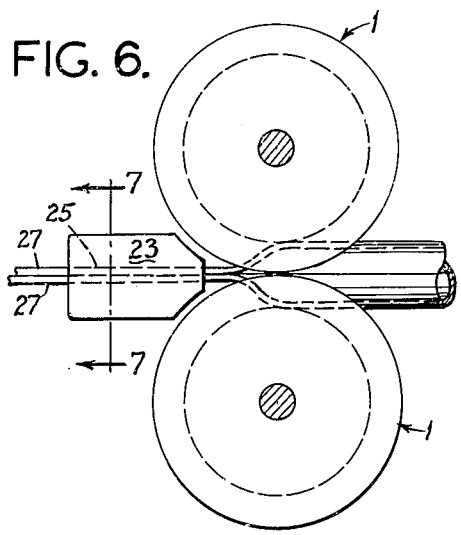
FIG. 6 is a view similar to FIG. 1, showing the process adapted to produce tubing.
Figure 3:
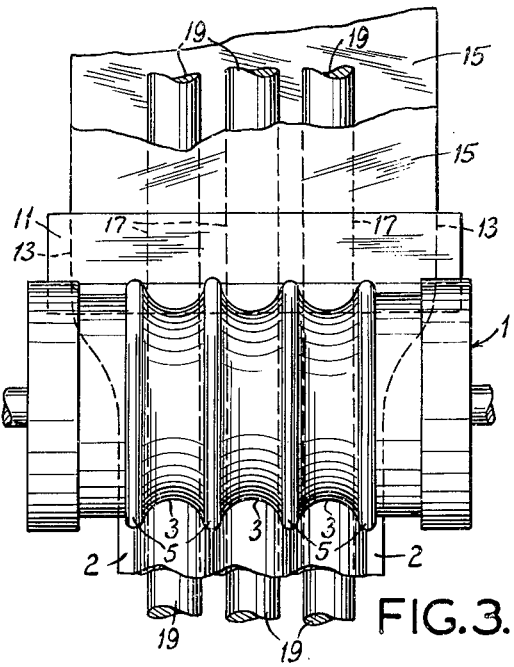
FIG. 3 is a top plan view of FIG. 2.
Figure 7:
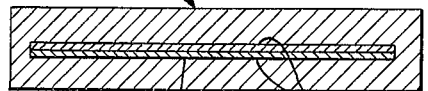
FIG. 7 is a cross section taken on line 7—7 of FIG. 6.

The process can also be carried out to make hollow tubing in a manner illustrated in FIG. 6, wherein the guide block lettered 23 (see also FIG. 7) is provided with a single slot 25 for the reception and guiding of two sheets 27 toward the rolls 1. In this case no wires are fed in between the sheets. As the sheets enter the rolls to become reduced by the lands 5, they separate into the grooves 7 between lands, each sheet arching or buckling up into its adjacent roll groove. Reduction by the rounded lands 5 not only produces finned connections between sheets, but also squeezes material into the farthest depths of the grooves. At the time the material is almost severed at the pinches 9, enough material has been forced into the grooves accurately to self-supportingly conform to the groove shape. Again the reduced fins are solid-phase bonded. In this case again it is preferable to sinter after emergence from the rolls 1 and before separation to weaken the cold-worked web material joining the tubes, while strengthening the bonds, in the fins.

Examples of dimensions useful for making tubing from sheet stock, as above described, are as follows:

TABLE II

*Making tubing from sheet stock*

| | Sheet Material | Sheet Thickness (inches) | Wall Thickness (inches) | Tube Diameter (inches) |
|---|---|---|---|---|
| 7 | Al | .016 | .016 | .060 |
| 8 | Al | .010 | .010 | .060 |
| 9 | Ni | .010 | .010 | .060 |

Figure 8:
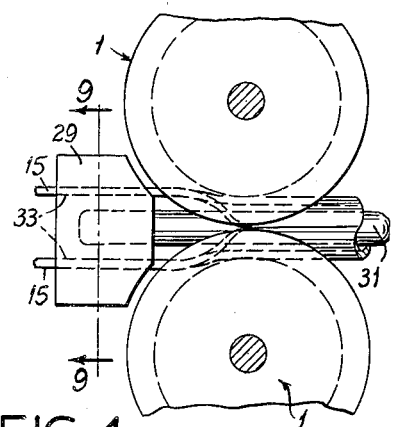
FIG. 8 is a view similar to FIG. 6, showing an alternative form of the invention.
Figure 9:
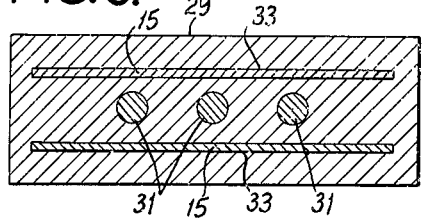
FIG. 9 is a cross section taken on line 9—9 of FIG. 8.
Figure 4:
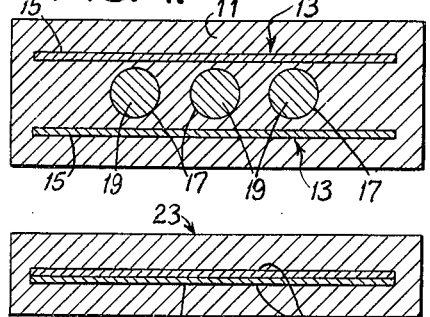
FIG. 4 is a cross section taken on line 4—4 of FIG. 1.

It has been found that in cases of round thin-walled tubing, wherein the ratio of outside diameter to wall thickness is greater than 6:1, the lateral spreading action due to reduction of thickness by the lands 5 is not sufficient for the material completely to conform to the groove curvature. In such cases, stationary arbors that are somewhat smaller in diameter than the inside diameter of the finished tubing may be inserted into the grooves between the rolls, as illustrated in FIGS. 8 and 9, so that the sheets are arched around them before entering between the roll lands 5. This precurves the sheet into a somewhat oval cross-sectional form and allows the lateral spread to finish rounding out the tube. The appropriate arrangement is shown in FIGS. 8 and 9, wherein the guide block is numbered 29. To this are attached the appropriate arbors, one of which is shown at 31 in FIG. 8, three of the same being shown in FIG. 9. These extend with clearance through the circular passages 7 formed by the grooves 3. The strips 15 pass through flat openings 33 therein around the arbors. The arbors 31 are smaller than the inside diameter of the finished tubing. They give a preliminary oval shape to the sheets, primarily to get more material close to the groove walls in addition to that available from the squeezing operation at the pinches 9 by the lands 5. Appropriate dimensional relationships for the material used in the process illustrated in FIGS. 8 and 9 are as follows:

TABLE III

*Making tubing from sheet stock with arbors*

| | Sheet Material | Sheet Thickness (inches) | Wall Thickness (inches) | Tube Diameter (inches) | Arbor Diameter (inches) |
|---|---|---|---|---|---|
| 10 | Al | .0007 | .0007 | .060 | .043 |
| 11 | Al | .001 | .001 | .060 | .043 |
| 12 | Ni | .001 | .001 | .060 | .043 |
| 13 | Ni | .002 | .002 | .060 | .043 |
| 14 | Ni | .003 | .003 | .060 | .043 |

Figure 10:
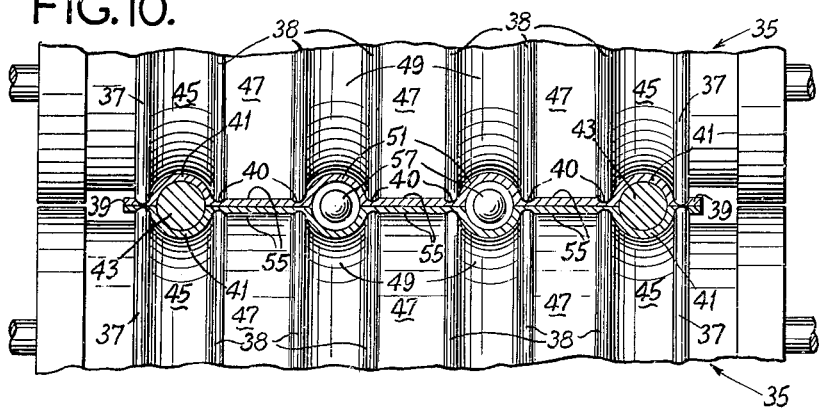
FIG. 10 is a view similar to FIG. 2, showing the process applied to the manufacture of a rod-and-tube-in-sheet product.

In FIG. 10 is shown another modification of the invention for constructing rod-in-sheet and tube-in-sheet structures. In this case the rolls 35 are provided with outer lands 37 for forming outside pinches 39 between cladding portions 41 on wires 43, as above described in connection with FIGS. 1–5, for example. The outer roll grooves for the purpose are shown at 45. Between the lands 37 are wide lands 47, preferably although not necessarily flat, separated by semicircular grooves 49, the latter adapted to form hollow tubular parts 51 in the manner above described in connection with FIGS. 8 and 9. Flanking the flat lands 47 are lands 38 which form pinches 40. The tangential spacing between corresponding pairs of lands 38 forming the pinches 40 is greater than that between corresponding pairs of lands 37 forming the pinches 39 but sufficient to effect a squeezing action which will form solid-phase bonds. The spacing between corresponding pairs of lands 47 is such that there is only a small amount, if any, of reduction effected upon the combined thicknesses of the sheet portions 55 therebetween. This is to prevent any damaging longitudinal shearing action between flatwise portions 55 and particularly the unsqueezed circular parts 51. The appropriate arbors for assisting and forming the tubular portions 51 are shown at 57. In some cases the arbors may be omitted and the method of FIGS. 6 and 7 employed. With this arrangement, solid-phase bonding is obtained by the pinching action on diametrically opposite sides of each rod 43 and on diametrically opposite sides of each tube 51. The edge material 39 may subsequently be broken off, but solid-phase bonded connections are left between the adjacent sheet portions 55 and the tubular portions 41 and 51. Only limited bonding, if any, may be expected between sheet portions 55, but it will be understood that in any event they act merely as strong supporting webs between the bonded cylindrical parts 41 and 51. By not substantially squeezing the sheet portions 55, the flow of metal for solid-phase bonding at pinches 40 is mostly transverse to the lengths of the cylinders such as 51, thereby not only avoiding the above-mentioned deleterious longitudinal shearing action but supplying the metal flow required for solid-phase bonding in the lines of pinch. The resulting product consists of a so-called tube-in-sheet part supported by rod-in-sheet parts constituted by the cladding 41 on the wire cores 43. A product of this type has important uses in the electronic tube industry. It will be understood that the partial bonds in connection with the FIG. 10 modification may be converted into a complete bond by subsequent sintering in the manner set forth above and in said patent. This sintering step converts any partial bond into a final bond.

From FIG. 10 it will be clear that a tube-in-sheet product may be formed without supporting wires such as 43. Such a product is useful in heat interchange apparatus for refrigerators, automobiles and the like. Wide sheets having many tubular elements such as 51, separated by at least partially bonded flat portions 55, may be conveniently constructed. Heretofore less accurate tube-in-sheet structures have been made by more costly methods such as masking off bonding between sheets and introducing inflating pressure in the masked portions, or heating the masking material to convert it to an inflating gas. According to the process herein, no inflation is required and the tubes are formed much more accurately.

Economy according to the present process arises from the fact that the tubes are formed to completion automatically by the bonding rolls, which at the same time effect bonding. Also, the partial bonds obtained during the forming operation may be very easily converted to final bonds by heat treatment, as by sintering. It will be understood, however, in the last-named connection, that there may be some instances wherein the partial bond which occurs during initial forming operation may be sufficient without the subsequent heat-treating sintering operation being required to improve the bond.

Figure 11:
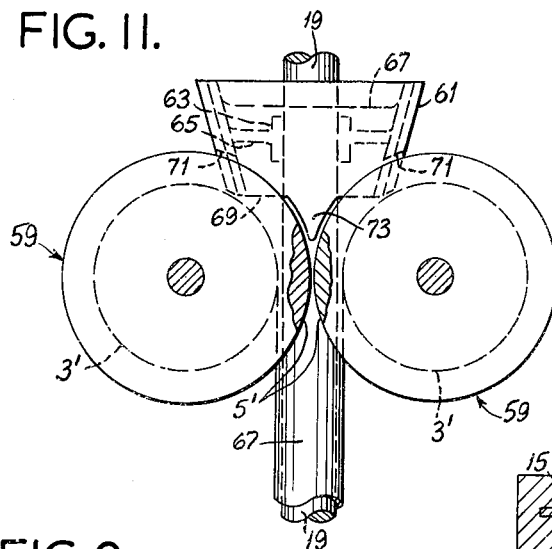
FIG. 11 is a diagrammatic side elevation similar to FIG. 1, partly in section, illustrating another form of the invention as applied to the manufacture of clad wire.

Another form of the invention is shown in FIG. 11, wherein rolls 59 of the type described in connection with FIGS. 1–6 are arranged with their axes side by side and in a common horizontal plane. These rolls 59 are of the same general form as rolls 1 in FIG. 1. They have lands 5' in close tangential juxtaposition. Between these lands 5' are semicircular grooves 3', like grooves 3 in FIG. 1. These are large enough in diameter to receive core material 19 with, if desired and as shown, surrounding spacing from the grooves. However, the core diameter may also be equal to or larger than the groove diameter and still achieve cladding and bonding as will be described. Adjacent the rolls, as shown, is a hopper 61, supporting a central guide 63 on spokes 65. The lower margins of the hopper are notched as shown at 71, to interdigitate with the axial contours of the rolls and form dams. At its ends the hopper has appropriately shaped tongues 73 forming endwise dams.

The hopper contains a clean powder cladding material 67 which gravitates through the open lower ends 69 of the hopper 61. In doing so, it passes through the openings between the spokes 65. After leaving the hopper, it enters between the cores (one of which is shown at 19) and the grooves 3'. Here it is compressed around the core 19 and squeezed between the lands 5'. Thus the powder contained by the hopper surrounds the cores, being squeezed and compacted into cladding compressed about the cores. This is true whether or not clearance is provided between the grooves and the core.

Upon the clad cores leaving the rolls, the comminuted powder particles are at least partially bonded to each other and to the core 19. Thereafter a sintering step is employed as above described. This sintering step increases the bond strength between the compressed powder particles and between the compacted powder cladding and the surface of the cores 19 (presumed to have been cleaned, as above described). The resulting clad wire is then ready for further processing, as for example drawing or the like. The materials constituting the powder 67 may, for example, be any metals or alloys thereof, or non-metals such as ceramics, cermets, carbon, glass, powders of which are susceptible to coherence upon squeezing and bonding upon sintering. The product is similar to that shown in FIG. 5, except that the cladding is constituted by compressed and sintered powder forming a practically solid mass adhering strongly to the cores 19.

Examples have been given above for thicknesses of cladding from strip sheets. These will serve also as a guide to the thickness of cores and cladding available with the FIG. 11 form of the invention.

A generic feature of all forms of the invention will be seen to be the solid-phase bonding of discrete clean portions, such that the sheets of FIGS. 1–10, or the particles of FIG. 11, by squeezing them along opposed stripes to form cylinders which are solid-phase bonded along the opposed stripes. It will also be seen that when sheets of metals are formed as in FIG. 1–10, each resulting cylinder may be hollow or filled with a core, and that when filled with a core the cladding may or may not be solid-phase bonded to the core in addition to the solid-phase bonding along the opposed stripes. In general, in the FIG. 11 form the particles of the cladding, in addition to bonding among themselves, will also bond to the core 19, provided the latter is clean. It will be understood that the term cylinder as used herein is not limited to cylinders of circular cross sections, since the grooves 3 may be other than of the semicircular form shown. The terms cylinder and sleeve are synonymous as used herein.

While the disclosure herein is concerned with rolls having multiple grooves, it will be understood that rolls may be employed in each of which there is a single groove for manufacturing single rods or tubes. The single-groove arrangement is also preferable in the case in which thin tube-forming or cladding materials are employed. If thin materials are to be manipulated in rolls having multiple sets of grooves, it may be desirable to preform or corrugate the thin material in the planes of the roll grooves, to minimize the amount of transverse stretch required to force the material into the grooves while passing through the rolls.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. The method of forming seamed cylindrical metal products comprising moving a pair of adjacently positioned substantially flat malleable completely solid metal strips and an interposed substantially smooth cylindrical completely solid rod, all of which are properly cleaned for solid-phase bonding in said solid state, movement being directed into regions between opposing lands of rolls each having at least two pinch-forming lands flanking a cylinder-forming groove conjugate to a like groove in the other, squeezing the strips together in said solid state on opposite sides of the rod and in the pinches with reductions of the strips on the rod and reductions in the thicknesses of the strips along two spaced stripes in each to effect partial solid-phase bonds between the strips and the rod and also along said stripes and thereafter sintering the partially bonded strips and rod by heating in said solid state to improve the bonds between the rod and the strips and between the strips along said stripes.

2. The method of forming seamed cylindrical metal products comprising moving through guides a pair of adjacently positioned substantially flat malleable solid metal strips which are properly cleaned on opposite faces for solid-phase bonding in said solid state, movement being directed into pinch regions between opposing lands of adjacent rolls each having at least two lands flanking a cylinder-forming groove conjugate to a like groove in the other, movement from the guides to the pinch regions being directed along opposite sides of an arbor which extends toward the space formed by the conjugate grooves, said arbor being substantially smaller than the inside surface of the bonded cylindrical product to precurve the strips in the grooves respectively, squeezing the strips together in said solid state in the pinch regions with reductions in the thicknesses of the strips along two spaced stripes in each to effect partial solid-phase bonds along said stripes and to squeeze a sufficient amount of said precurved material into the grooves for completing substantial conformation of the strips to the shapes of the grooves to form a complete cylinder conforming exteriorly substantially to the shape of the conjugate grooves and thereafter sintering the partially bonded strips by heating in said solid state to improve the bonds along the stripes.

References Cited by the Examiner

UNITED STATES PATENTS

| | | | |
|---|---|---|---|
| 246,407 | 8/1881 | McTighe | 29—470.1 X |
| 2,607,109 | 8/1952 | Reynolds | 29—411 |
| 2,691,815 | 10/1954 | Boessenkool et al. | |
| 2,778,097 | 1/1957 | Berg | 29—193.5 |
| 2,815,567 | 12/1957 | Gould et al. | 29—420 |
| 2,854,737 | 10/1958 | Gray | 29—194 |
| 2,860,409 | 11/1958 | Boessenkool et al. | 29—497 |
| 2,891,304 | 6/1959 | Colvin | 29—193.5 |
| 2,902,755 | 9/1959 | Salt et al. | 29—420 |
| 2,908,966 | 10/1959 | Wagner | 29—194 |
| 2,947,078 | 8/1960 | Pflumm et al. | 29—497 |
| 3,092,470 | 6/1963 | Ripling | 29—423 |

FOREIGN PATENTS

| | | |
|---|---|---|
| 122,897 | 5/1931 | Austria. |
| 304,736 | 4/1930 | Great Britain. |

JOHN F. CAMPBELL, *Primary Examiner.*

WHITMORE A. WILTZ, *Examiner.*